(12) United States Patent
Sudarmani

(10) Patent No.: US 11,543,999 B2
(45) Date of Patent: Jan. 3, 2023

(54) MEMORY CONTROLLER AND OPERATING METHOD THEREOF

(71) Applicant: SK hynix Inc., Gyeonggi-do (KR)

(72) Inventor: Rengaraja Sudarmani, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 41 days.

(21) Appl. No.: 17/037,876

(22) Filed: Sep. 30, 2020

(65) Prior Publication Data
US 2021/0342093 A1 Nov. 4, 2021

(30) Foreign Application Priority Data

Apr. 29, 2020 (KR) .................. 10-2020-0052851

(51) Int. Cl.
*G06F 3/06* (2006.01)
(52) U.S. Cl.
CPC .......... *G06F 3/0658* (2013.01); *G06F 3/0617* (2013.01); *G06F 3/0659* (2013.01); *G06F 3/0679* (2013.01)
(58) Field of Classification Search
CPC ..... G06F 3/0658; G06F 3/0659; G06F 3/0617
See application file for complete search history.

(56) References Cited

FOREIGN PATENT DOCUMENTS

KR 10-2017-0014874 2/2017

OTHER PUBLICATIONS

Lee et al., Preemptible I/O Scheduling of Garbage Collection for Solid State Drives, IEEE Transactions on Computer-Aided Design of Integrated Circuits and Systems, Feb. 2013, pp. 247-260, vol. 32, No. 2.
MIPI Alliance, Inc., Specification for Unified Protocol (UniPro®) Version 1.8, Sep. 2017.
MIPI Alliance, Inc., Specification for M-PHY® Version 4.1, Dec. 2016.

*Primary Examiner* — Charles Rones
*Assistant Examiner* — Han V Doan
(74) *Attorney, Agent, or Firm* — IP & T Group LLP

(57) ABSTRACT

A memory controller for controlling a memory device includes a host interface and a background controller. The host interface communicates with a host through a link, determines whether quality of the link has been degraded by monitoring the quality of the link, and performs a link recovery operation on the link when it is determined that the quality of the link is degraded. The background controller controls the memory device to perform a background operation, while the link recovery operation is being performed.

18 Claims, 13 Drawing Sheets

MEMORY CONTROLLER AND OPERATING METHOD THEREOF

CROSS-REFERENCE TO RELATED APPLICATION

The present application claims priority under 35 U.S.C. § 119(a) to Korean patent application number 10-2020-0052851, filed on Apr. 29, 2020, which is incorporated herein by reference in its entirety.

BACKGROUND

Field of Invention

The present disclosure generally relates to an electronic device, and more particularly, to a memory controller and an operating method thereof.

Description of Related Art

A storage device stores data under the control of a host device such as a computer or a smart phone. The storage device may include a memory device for storing data and a memory controller for controlling the memory device. Generally, there are two types of memory devices: volatile memory devices and nonvolatile memory devices.

In a volatile memory device data is stored only when power is supplied; stored data is lost when the supply of power is interrupted. Examples of volatile memory devices include a Static Random Access Memory (SRAM), a Dynamic Random Access Memory (DRAM), and the like.

In a nonvolatile memory device data is retained even when the supply of power is interrupted. Examples of nonvolatile memory devices include a Read Only Memory (ROM), a Programmable ROM (PROM), an Electrically Programmable ROM (EPROM), an Electrically Erasable ROM (EEROM), a flash memory, and the like.

SUMMARY

Embodiments provide a memory controller for efficiently performing a background operation and an operating method of the memory controller.

In accordance with an aspect of the present disclosure, there is provided a memory controller for controlling a memory device, the memory controller including: a host interface configured to communicate with a host through a link, determine whether quality of the link has been degraded by monitoring the quality of the link, and perform a link recovery operation on the link when it is determined that the quality of the link is degraded; and a background controller configured to control the memory device to perform a background operation, while the link recovery operation is being performed.

In accordance with another aspect of the present disclosure, there is provided a method for operating a memory controller for controlling a memory device, the method including: determining whether quality of a link for communication with a host has been degraded, based on a result obtained by monitoring the quality of the link; performing a link recovery operation on the link when it is determined that the quality of the link is degraded; and controlling the memory device to perform a background operation, while the link recovery operation is being performed.

In accordance with another aspect of the present disclosure, there is provided a method for operating a memory controller for communicating with a host through a link and controlling a memory device, the operating method comprising: recovering the link; and controlling the memory device to perform one or more background operations during the recovering.

BRIEF DESCRIPTION OF THE DRAWINGS

Various embodiments are described more fully below with reference to the accompanying drawings; however, the present invention may be embodied in different forms and thus should not be construed as limited to the embodiments set forth herein. Rather, these embodiments are provided so that this disclosure is thorough and complete and fully conveys the scope of the embodiments to those skilled in the art.

DETAILED DESCRIPTION

The specific structural and functional description disclosed herein is merely for the purpose of describing embodiments according to the concept of the present disclosure. The present invention, however, can be implemented in various forms, and thus is not limited to the embodiments set forth herein.

Figure 1:
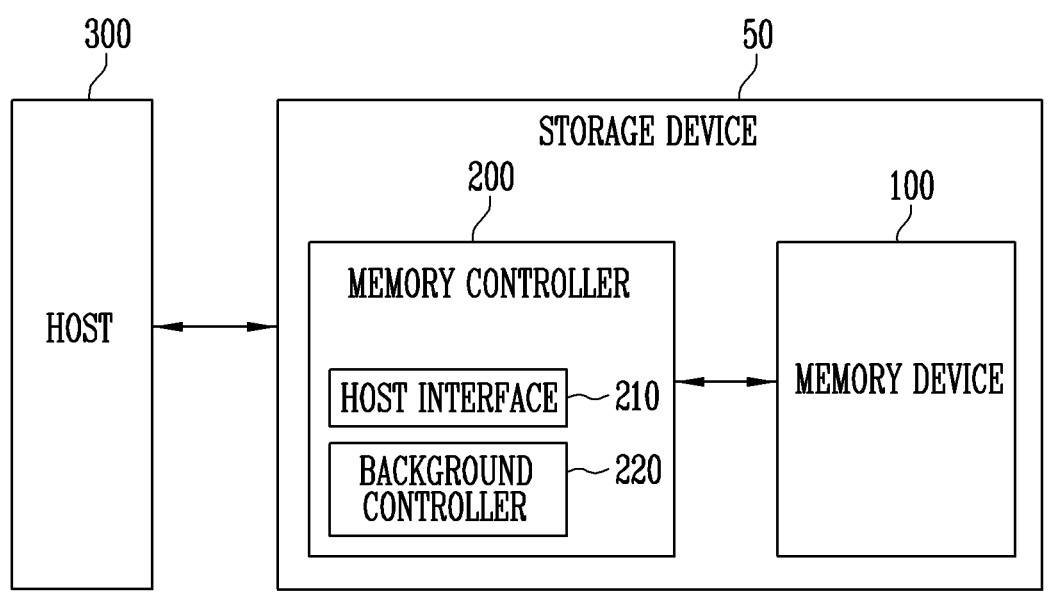
FIG. 1 is a diagram illustrating a storage device in accordance with an embodiment of the present disclosure.

FIG. 1 is a diagram illustrating a storage device in accordance with an embodiment of the present disclosure.

Referring to FIG. 1, the storage device 50 may include a memory device 100 and a memory controller 200 configured to control performance of an operation of the memory device 100. The storage device 50 may store data under the control of a host 300, such as a mobile phone, a smart phone, an MP3 player, a laptop computer, a desktop computer, a game console, a TV, a tablet PC or an in-vehicle infotainment.

The storage device 50 may be configured as any of various types of storage devices according to a host interface that is a communication scheme with the host 300. For example, the storage device 50 may be implemented with any of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), and/or a memory stick.

The storage device 50 may be manufactured as any of various kinds of package types. For example, the storage device 50 may be manufactured as a Package-On-Package (POP), a System-In-Package (SIP), a System-On-Chip (SOC), a Multi-Chip Package (MCP), a Chip-On-Board (COB), a Wafer-level Fabricated Package (WFP), and/or a Wafer-level Stack Package (WSP).

The memory device 100 may store data. The memory device 100 operates under the control of the memory controller 200. The memory device 100 may include a memory cell array including a plurality of memory cells for storing data.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100.

The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, by way of example, the invention is described in the context in which the memory device 100 is a NAND flash memory.

The memory device 100 receives a command and an address from the memory controller 200 and accesses an area selected by the address in the memory cell array. That is, the memory device 100 may perform an operation instructed by the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

The memory controller 200 may control overall operation of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a command, an address, and data without a request from the host 300, and transmit the command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. The memory controller 200 may control the memory devices according to an interleaving scheme so as to improve operational performance. The interleaving scheme may be an operating scheme that allows operating times of at least two memory devices 100 to overlap with each other.

In an embodiment, the memory controller 200 may include a host interface 210 and a background controller 220.

The host interface 210 may communicate with the host 300 through a link.

In an embodiment, the host interface 210 may include various layers such as a physical layer, a data link layer, a network layer, and a transport layer. In an embodiment, a protocol applied to the physical layer may include M-PHY®. A protocol applied to the transport layer may include UniPro® for UFS communication. However, the protocols of the respective layers is not limited to these examples.

The host interface 210 may monitor quality of the link between the host 300 and the storage device 50. The host interface 210 may generate link quality information representing whether the quality of the link has been degraded based on the monitoring result.

In an embodiment, the host interface 210 may perform a link recovery operation based on the link quality information. For example, when it is determined, based on the link quality information, that the quality of the link has been degraded, the host interface 210 may perform the link recovery operation. In various embodiments, the host interface 210 may perform the link recovery operation in response to a request of the host 300.

The link recovery operation may compensate for quality degradation of the link, which is caused by a change in voltage condition of the link, a change in current condition of the link, and/or a change in temperature condition of the link. When the host interface 210 performs the link recovery operation, the host interface 210 may equalize, to a reference condition, the voltage condition of the link, the current condition of the link, and/or the temperature condition of the link.

In an embodiment, the reference condition may be determined according to the protocol applied to the link. For example, when the physical layer in the link corresponds to the M-PHY® protocol, the reference condition may include a voltage condition, a current condition, and/or a temperature condition, which are defined in the M-PHY® protocol standard for proper communication of a physical signal exchanged between a transmitter and a receiver.

In another embodiment, the reference condition may be determined according to a request of the host 300. For example, the host 300 may set, as the reference condition, a voltage condition, a current condition, and/or a temperature condition for proper communication between the host 300 and the host interface 210. The host 300 may provide the host interface 210 with information on the set reference condition.

The host interface 210 may generate link recovery time information on the link recovery operation. The host interface 210 may provide the link recovery time information to the background controller 220. The host interface 210 may generate link recovery initiation information representing a time at which the link recovery operation is initiated. The host interface 210 may generate link recovery finish information representing a time at which the link recovery operation is finished. The background controller 220 may control the memory device 100 to perform a background operation, while the link recovery operation is being performed, i.e., during the link recovery time. The background operation may include a general operation, which is performed regardless of any request of the host 300 to maintain performance of the memory device 100. In an embodiment, the background operation may include a read reclaim operation, a garbage collection operation, a wear leveling operation, or the like. The read reclaim operation may move data stored in a memory block to another memory block according to a read count of each of a plurality of memory blocks such that read counts among the plurality of memory blocks are uniform. The garbage collection operation may secure free block(s) by storing valid data currently stored in victim block(s) in another memory block and then erasing remaining data in the victim block(s) to generate free block(s). The wear leveling operation may move data stored in a memory block to another memory block according to an erase/write count of each of a plurality of memory blocks such that erase/write counts of the plurality of memory blocks are uniform.

The background controller 220 may include a background queue. In various embodiments, the background queue may be located at the outside of the background controller 220. The background queue may store at least one background command instructing a background operation on the memory device 100.

The background controller 220 may determine an order in which background commands stored in the background queue are output to the memory device 100 based on the link recovery time information on the link recover operation. The background controller 220 may provide the memory device 100 with the background commands stored in the background queue according to the determined order, while the link recovery operation is being performed.

In an embodiment, the background controller 220 may store command processing time information on each of the background commands. The background controller 220 may compare the command processing time information with the link recovery time information on the link recovery operation. The background controller 220 may provide a target background command to be preferentially provided to the memory device 100, among the background commands stored in the background queue, based on the comparison result.

In an embodiment, the background controller 220 may provide the memory device 100 with a background command stored in the background queue in response to the link recovery initiation information. The background controller 220 may suspend or stop providing any background command remaining in the background queue to the memory device 100 in response to the link recovery finish information.

The host 300 may communicate with the storage device 50, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

Figure 2:
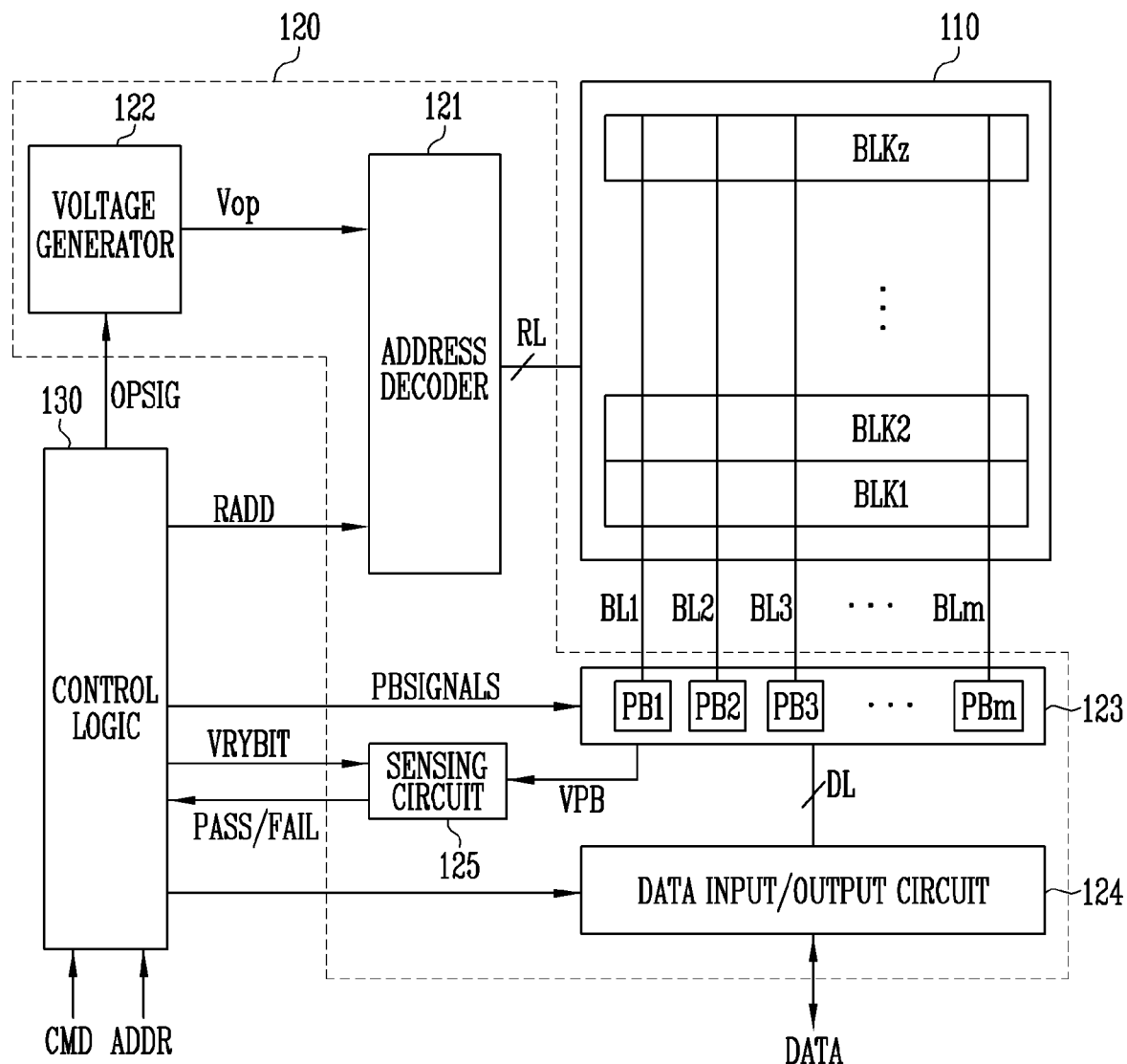
FIG. 2 is a diagram illustrating a structure of a memory device shown in FIG. 1.

FIG. 2 is a diagram illustrating a structure of the memory device shown in FIG. 1.

Referring to FIG. 2, the memory device 100 may include a memory cell array 110, a peripheral circuit 120, and control logic 130.

The memory cell array 110 includes a plurality of memory blocks BLK1 to BLKz, which are coupled to an address decoder 121 through row lines RL. The plurality of memory blocks BLK1 to BLKz are coupled to a read/write circuit 123 through bit lines BL1 to BLm. Each of the plurality of memory blocks BLK1 to BLKz includes a plurality of memory cells. In an embodiment, the plurality of memory cells may be nonvolatile memory cells. Memory cells coupled to the same word line may be defined as one physical page. That is, the memory cell array 110 may be configured with a plurality of physical pages. In accordance with an embodiment of the present disclosure, each of the plurality of memory blocks BLK1 to BLKz in the memory cell array 110 may include a plurality of dummy cells. One or more dummy cells may be coupled in series between a drain select transistor and memory cells and between a source select transistor and memory cells.

Each of the memory cells of the memory device may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The peripheral circuit 120 may include the address decoder 121, a voltage generator 122, the read/write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is coupled to the memory cell array 110 through the row lines RL. The row lines RL may include drain select lines, word lines, source select lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may operate under the control of the control logic 130. The address decoder 121 receives an address ADDR from the control logic 130.

The address decoder 121 may decode a block address in the received address ADDR. The address decoder 121 selects at least one memory block among the memory blocks BLK1 to BLKz according to the decoded block address. The address decoder 121 may decode a row address in the received address ADDR. The address decoder 121 may select at least one word line among word lines of a memory block selected according to the decoded row address. The address decoder 121 may apply an operating voltage Vop supplied from the voltage generator 122 to the selected word line.

In a program operation, the address decoder 121 may apply a program voltage to the selected word line, and apply a pass voltage lower than the program voltage to unselected word lines. In a program verify operation, the address decoder 121 may apply a verify voltage to the selected word line, and apply a verify pass voltage higher than the verify voltage to the unselected word lines.

In a read operation, the address decoder 121 may apply a read voltage to the selected word line, and apply a read pass voltage higher than the read voltage to the unselected word lines.

In accordance with an embodiment of the present disclosure, an erase operation of the memory device 100 is performed in units of memory blocks. In an erase operation, the address ADDR input to the memory device 100 includes a block address. The address decoder 121 may decode the block address and select at least memory block according to the decoded block address. In the erase operation, the address decoder 121 may apply a ground voltage to word lines coupled to the selected memory block.

In accordance with an embodiment of the present disclosure, the address decoder 121 may decode a column address in the address ADDR transmitted thereto. The decoded column address may be transmitted to the read/write circuit 123. In an example, the address decoder 121 may include components such as a row decoder, a column decoder, and an address buffer.

The voltage generator 122 may generate a plurality of operating voltages Vop by using an external power voltage supplied to the memory device 100. The voltage generator 122 operates under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of operating voltages Vop by using the external power voltage or the internal power voltage. The voltage generator 122 may generate various voltages for use by the memory device 100. For example, the voltage generator 122 may generate a plurality of erase voltages, a plurality of program voltages, a plurality of pass voltages, a plurality of select read voltages, and a plurality of unselect read voltages.

In order to generate a plurality of operating voltages Vop having various voltage levels, the voltage generator 122 may include a plurality of pumping capacitors for receiving the internal power voltage, and generate the plurality of operating voltages Vop by selectively activating the plurality of pumping capacitors under the control of the control logic 130.

The plurality of generated voltages Vop may be supplied to the memory cell array 110 by the address decoder 121.

The read/write circuit 123 includes first to mth page buffers PB1 to PBm that are coupled to the memory cell array 110 through the respective first to mth bit lines BL1 to BLm. The first to mth page buffers PB1 to PBm operate under the control of the control logic 130.

The first to mth page buffers PB1 to PBm communicate data DATA with the data input/output circuit 124. In a program operation, the first to mth page buffers PB1 to PBm receive data DATA to be stored through the data input/output circuit 124 and data lines DL.

In a program operation, the first to mth page buffers PB1 to PBm may transfer, to selected memory cells through the bit lines BL1 to BLm, data DATA received through the data input/output circuit 124 when a program pulse is applied to a selected word line. The memory cells of the selected memory cells are programmed according to the transferred data DATA. A memory cell coupled to a bit line through which a program allow voltage (e.g., a ground voltage) is applied may have an increased threshold voltage. A threshold voltage of a memory cell coupled to a bit line through which a program inhibit voltage (e.g., a power voltage) is applied may be maintained. In a program verify operation, the first to mth page buffers PB1 to PBm read data DATA stored in the selected memory cells from the selected memory cells through the bit lines BL1 to BLm.

In a read operation, the read/write circuit 123 may read data DATA from memory cells of a selected page through the bit lines BL, and store the read data DATA in the first to mth page buffers PB1 to PBm.

In an erase operation, the read/write circuit 123 may float the bit lines BL. In an embodiment, the read/write circuit 123 may include a column select circuit.

The data input/output circuit 124 is coupled to the first to mth page buffers PB1 to PBm through the data lines DL. The data input/output circuit 124 operates under the control of the control logic 130.

The data input/output circuit 124 may include a plurality of input/output buffers (not shown) that receive input data DATA. In a program operation, the data input/output circuit 124 may receive data DATA to be stored from an external controller (not shown). In a read operation, the data input/output circuit 124 outputs, to the external controller, data transmitted from the first to mth page buffers PB1 to PBm included in the read/write circuit 123.

In a read operation or verify operation, the sensing circuit 125 may generate a reference current in response to an allow bit VRYBIT signal generated by the control logic 130, and output a pass signal or fail signal to the control logic 130 as a result of comparing a sensing voltage VPB received from the read/write circuit 123 and a reference voltage generated by the reference current.

The control logic 130 may be coupled to the address decoder 121, the voltage generator 122, the read/write circuit 123, the data input/output circuit 124, and the sensing circuit 125. The control logic 130 may control overall operation of the memory device 100. The control logic 130 may operate in response to a command CMD transferred from an external device.

The control logic 130 may control the peripheral circuit 120 by generating several signals in response to a command CMD and an address ADDR. For example, the control logic 130 may generate an operation signal OPSIG, a row address RADD, a read/write circuit control signal PBSIGNALS, and an allow bit VRYBIT in response to the command CMD and the address ADDR. The control logic 130 may output the operation signal OPSIG to the voltage generator 122, output the row address RADD to the address decoder 121, output the read/write circuit control signal PBSIGNALS to the read/write circuit 123, and output the allow bit VRYBIT to the sensing circuit 125. Also, the control logic 130 may determine whether the verify operation has passed or failed in response to the pass or fail signal PASS/FAIL output by the sensing circuit 125.

Figure 3:
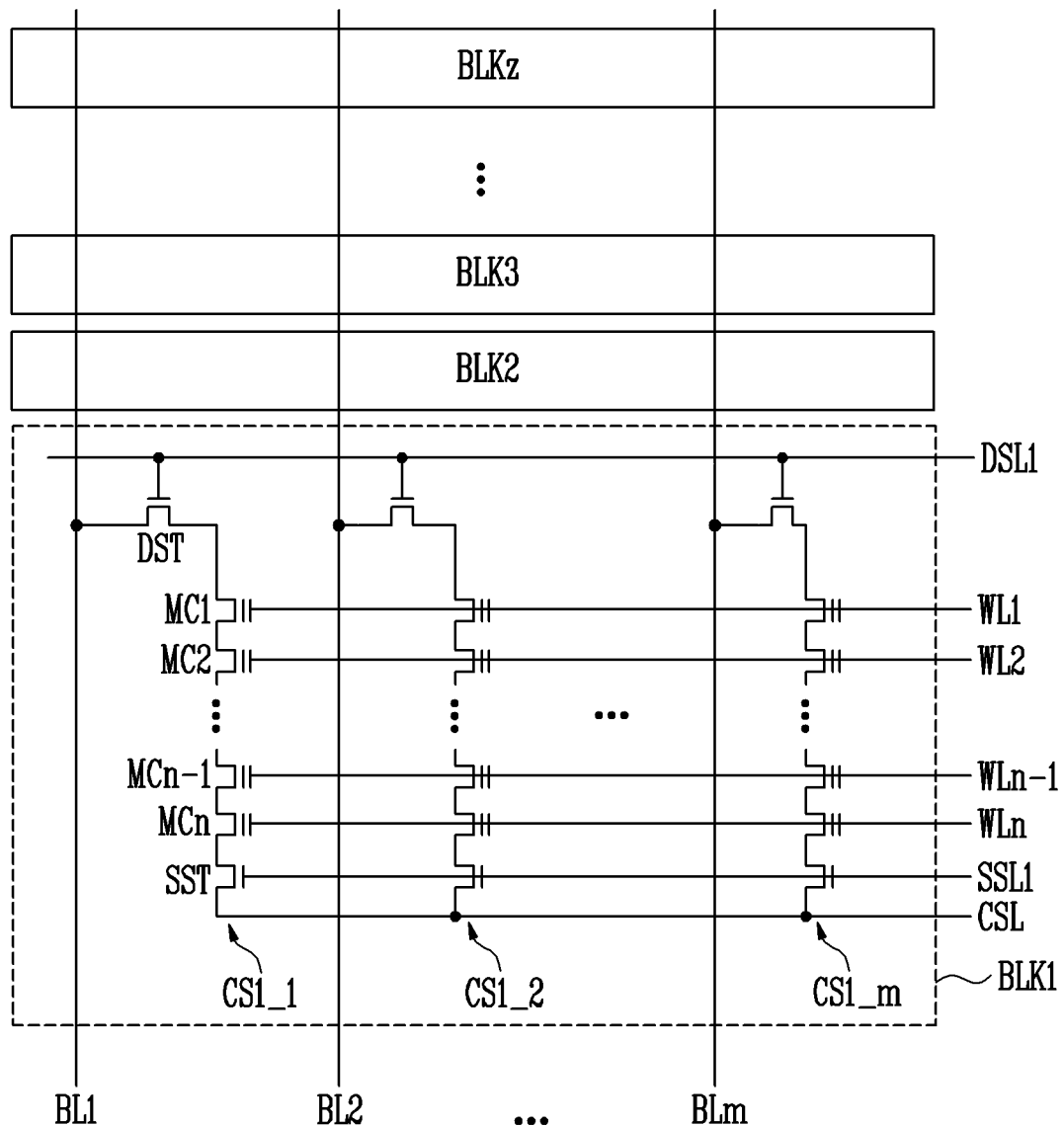
FIG. 3 is a diagram illustrating a memory cell array, such as that shown in FIG. 2.

FIG. 3 is a diagram illustrating the memory cell array shown in FIG. 2.

Referring to FIG. 3, first to zth memory blocks BLK1 to BLKz are commonly coupled to the first to mth bit lines BL1 to BLm. In FIG. 3, components included in the first memory block BLK1 among the plurality of memory blocks BLK1 to BLKz are illustrated and described; components included in each of the other memory blocks BLK2 to BLKz are omitted. It will be understood that each of the other memory blocks BLK2 to BLKz is configured identically to the first memory block BLK1.

The memory block BLK1 may include a plurality of cell strings CS1_1 to CS1_$m$ ($m$ is a positive integer). First to mth cell strings CS1_1 to CS1_$m$ are respectively coupled to the first to mth bit lines BL1 to BLm. Each of the first to mth cell strings CS1_1 to CS1_$m$ includes a drain select transistor DST, a plurality of memory cells MC1 to MCn ($n$ is a positive integer) coupled in series, and a source select transistor SST.

A gate terminal of the drain select transistor DST included in each of the first to mth cell strings CS1_1 to CS1_$m$ is coupled to a drain select line DSL1. Gate terminals of first to nth memory cells MC1 to MCn included in each of the first to mth cell strings CS1_1 to CS1_$m$ are respectively coupled to first to nth word lines WL1 to WLn. A gate terminal of the source select transistor SST included in each of the first to mth cell strings CS1_1 to CS1_$m$ is coupled to a source select line SSL1.

By way of example, structure of the first cell string CS1_1, among the plurality of cell strings CS1_1 to CS1_$m$, is described. Each of the other cell strings CS1_2 to CS1_$m$ is configured identically to the first cell string CS1_1.

A drain terminal of the drain select transistor DST included in the first cell string CS1_1 is coupled to the first bit line BL1. A source electrode of the drain select transistor DST included in the first cell string CS1_1 is coupled to a drain terminal of the first memory cell MC1 included in the first cell string CS1_1. The first to nth memory cells MC1 to MCn are coupled in series to each other. A drain terminal of the source select transistor SST included in the first cell string CS1_1 is coupled to a source terminal of the nth memory cell MCn included in the first cell string CS1_1. A source terminal of the source select transistor SST included in the first cell string CS1_1 is coupled to a common source line CSL. In an embodiment, the common source line CSL may be commonly coupled to the first to zth memory blocks BLK1 to BLKz.

The drain select line DSL1, the first to nth word lines WL1 to WLn, and the source select line SSL1 are included in the row lines RL shown in FIG. 2. The drain select line DSL1, the first to nth word lines WL1 to WLn, and the source select line SSL1 are controlled by the address decoder 121 shown in FIG. 2. The common source line CSL may be controlled by the control logic 130 shown in FIG. 2. The first to mth bit lines BL1 to BLm are controlled by the read/write circuit 123 shown in FIG. 2.

Figure 4:
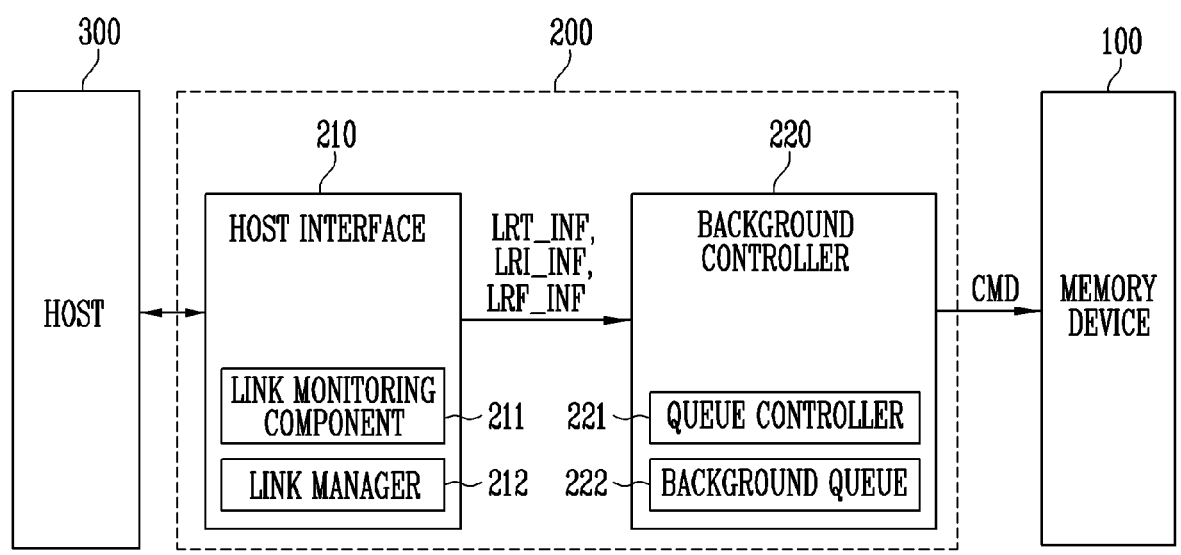
FIG. 4 is a diagram illustrating a configuration and an operation of a memory controller, such as that shown in FIG. 1.

FIG. 4 is a diagram illustrating a configuration and an operation of the memory controller shown in FIG. 1.

In an embodiment, the memory controller 200 may include a host interface 210 and a background controller 220. The memory controller 200 may communicate with the host 300 through the host interface 210.

The host interface 210 may include a link monitoring component 211 and a link manager 212. The link monitoring component 211 may monitor quality of a link, e.g., the link between memory controller 200 and the host 300. The link monitoring component 211 may generate link quality information representing whether the quality of the link has been degraded based on the monitoring result.

The link manager 212 may perform a link recovery operation based on the link quality information. For example, the link manager 212 may perform the link recovery operation when it is determined, based on the link quality information, that the quality of link has been degraded. In various embodiments, the link manager 212 may perform the link recovery operation in response to a request of the host 300.

When the link manager 212 performs the link recovery operation, the link manager 212 may equalize a voltage condition of the link, a current condition of the link, and/or a temperature condition of the link with a respective reference condition.

In an embodiment, the reference condition may be determined according to a protocol applied to the link. For example, when a physical layer in the link corresponds to the M-PHY® protocol, the reference condition may be a voltage condition, a current condition, and/or a temperature condition, each of which is defined in the M-PHY® for normal communication between a transmitter and a receiver.

In another embodiment, the reference condition may be determined according to a request of host 300. For example, the host 300 may set, as the reference condition(s), a voltage condition, a current condition, and/or a temperature condition for proper communication between the host 300 and the host interface 210. The host 300 may provide the link manager 212 with information on the set reference condition(s).

The link manager 212 may generate link recovery time information LRT_INF on the link recovery operation. The link manager 212 may provide the link recovery time information LRT_INF to a queue controller 221. The link manager 212 may generate link recovery initiation information LRI_INF representing a time at which the link recovery operation is initiated. The link manager 212 may generate link recover finish information LRF_INF representing a time at which the link recovery operation is finished.

The background controller 220 may control the memory device 100 to perform a background operation, while the link recovery operation is being performed. The background operation may include a general operation performed without any request of the host 300 to maintain performance of the memory device 100. In an embodiment, the background operation may include a read reclaim operation, a garbage collection operation, a wear leveling operation, or the like.

The background controller 220 may include the queue controller 221 and a background queue 222. In various embodiments, the background queue 222 may be within or externally to the background controller 220. The background queue 222 may store at least one background command instructing a background operation on the memory device 100.

The queue controller 221 may determine an order in which background commands stored in the background queue 222 are output to the memory device 100 based on the link recovery time information LRT_INF on the link recovery operation. While the link recovery operation is being performed, the queue controller 221 may provide the memory device 100 with the background commands stored in the background queue 222 according to the determined order.

In an embodiment, the queue controller 221 may store command processing time information on each of the background commands. The queue controller 221 may compare the command process time information with the link recovery time information LRT_INF of the link recovery operation. The queue controller 221 may determine an order in which one or more background commands, among the background commands stored in the background queue 222, are provided to the memory device 100 based on the comparison result.

A command providing order may be determined in various ways. For example, the queue controller 221 may determine the order in which commands are provided such that the largest number of background commands is processed while the link recovery operation is being performed. For example, the queue controller 221 may determine the order in which commands are provided such that a background command that takes the longest time to be processed, among the queued background commands, is preferentially processed while the link recovery operation is being performed. For example, the queue controller 221 may determine the order in which commands are provided such that a background command of which command processing time is a reference time or less, among the queued background commands, is preferentially processed. For example, the queue controller 221 may determine the order in which commands are provided such that a background command of which command processing time is the reference time or more, among the queued background commands, is preferentially processed.

In an embodiment, the queue controller 221 may provide the memory device 100 with a target background command to be preferentially processed, among the background commands stored in the background queue 222, based on the determined order.

In an embodiment, the queue controller 221 may provide the memory device 100 with a background command stored in the background queue 222 in response to the link recovery initiation information LRI_INF. The queue controller 221 may suspend or stop providing any background command remaining in the background queue 222 to the memory device 100 in response to the link recovery finish information LRF_INF.

Figure 5:
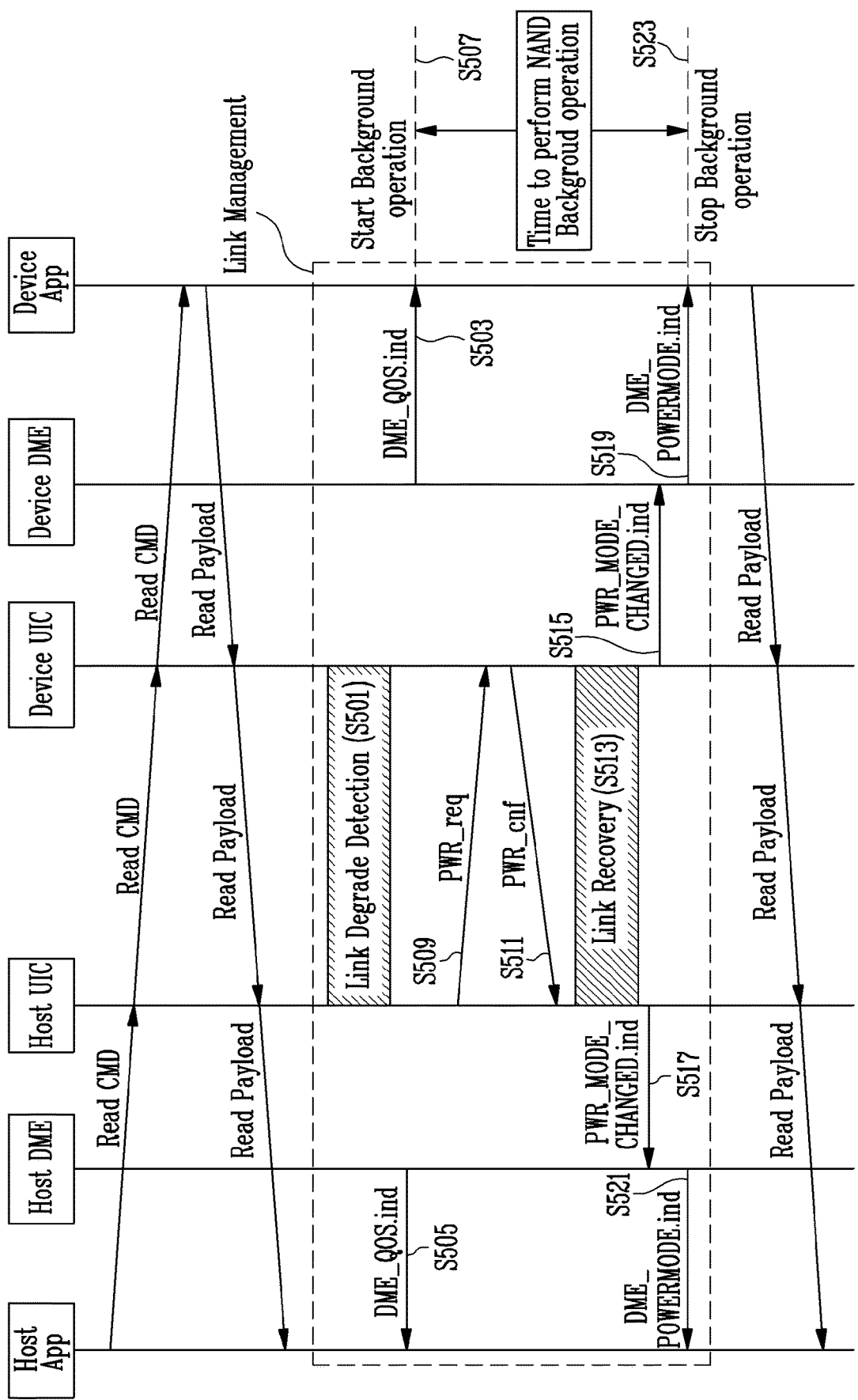
FIG. 5 is a diagram illustrating a link management operation in accordance with an embodiment of the present disclosure.

FIG. 5 is a diagram illustrating a link management operation in accordance with an embodiment of the present disclosure.

Referring to FIG. 5, the host described with reference to FIG. 1 may include a host application (Host App), a host device management entity (Host DME), and a host UFS interconnection layer (host UIC). The storage device of FIG. 1 may include a device application (Device App), a device device management entity (Device DME), and a device UFS interconnection layer (Device UIC).

The host may generate a command for the storage device through the Host App, and provide the generated command to the storage device through the Host DME and the Host UIC. The storage device may receive a command generated by the host through the Device UIC and the Device DME, and execute the received command through the Device App.

In an embodiment, the host and the storage device may communicate with each other through exchange of a physical signal. The physical signal may be exchanged through a link generated between the Host UIC and the Device UIC. The Host DME may control the Host UIC, and the Device DME may control the Device UIC.

In FIG. 5, a read command issued by the Host App may be transferred to the Device UIC through the Host DME and the Host UIC. The read command transferred to the Device UIC may be transferred to the Device App via the Device DME.

The Device App may perform a read operation on the memory device and acquire read data (Read Payload) from the memory device, in response to the read command. The acquired read data may be transferred to the Host UIC through the Device DME and the Device UIC. The read data transferred to the Host UIC may be transferred to the Host App via the Host DME.

In connection with FIG. 5, a link management operation of performing a link recovery operation when link quality degradation is detected and a background operation performed on the memory device while the link recovery operation is being performed are described.

Quality degradation of the link may be detected in the Host UIC and the Device UIC (S501).

When the quality degradation of the link is detected in the Device UIC, the Device DME may provide the Device App with an indicator DME_QOS.ind representing that the link recovery operation is necessary since quality of the link is degraded (S503).

When the quality degradation of the link is detected in the Host UIC, the Host DME may provide the Host App with an indicator DME_QOS.ind representing that the link recovery operation is necessary since quality of the link is degraded (S505).

When the Device App receives the indicator DME_QOS.ind from the Device DME, the Device App may control the memory device to initiate the background operation (S507).

The Host UIC may transfer an indicator PWR_req requesting a change in power configuration under the control of the Host DME (S509).

When the Device UIC receives the indication PWR_req requesting the change in power configuration, the Device UIC may transfer, to the Host UIC, a response indicator PWR_cnf representing whether the request of the change in power configuration has been accepted or rejected, under the control of the Device DME (S511).

The link recovery operation for recovering link quality between the Host UIC and the Device UIC may be performed (S513). The link recovery operation may equalize a voltage condition, a current condition, or a temperature condition of the link with a corresponding reference condition. The link recovery operation may be performed on at least one of the Host UIC and the Device UIC.

In an embodiment, the link recovery operation may be performed according to a request of the host. In another embodiment, the link recovery operation may be performed under the control of the storage device.

When the link recovery operation is completed, the Device UIC may provide the Device DME with an indicator PWR_MODE_CHANGED.ind including a result obtained by changing a power mode (S515). Like the Device UIC, the Host UIC may provide the Host DME with an indicator PWR_MODE_CHANGED.ind including a result obtained by changing a power mode (S517).

When the Device DME receives the indicator PWR_MODE_CHANGED.ind, the Device DME may provide the Device App with an indicator DME_POWERMODE.ind including parameters for the power mode change (S519).

When the Host DME receives the indicator PWR_MODE_CHANGED.ind including the result obtained by changing the power mode, the Host DME may provide the Host App with an indicator DME_POWERMODE.ind including parameters for the power mode change (S521).

When the Device App receives the indicator DME_POWERMODE.ind including the parameters for the power mode change, the Device App may control the memory device to suspend the background operation (S523).

When the link recovery operation is completed, the communication between the host and the storage device may be resumed, as before the link quality degradation is detected.

In an embodiment, the Device UIC and the Device DME may be implemented by the host interface described with reference to FIG. 1. The Device App may be implemented by the background controller described with reference to FIG. 1.

Figure 6:
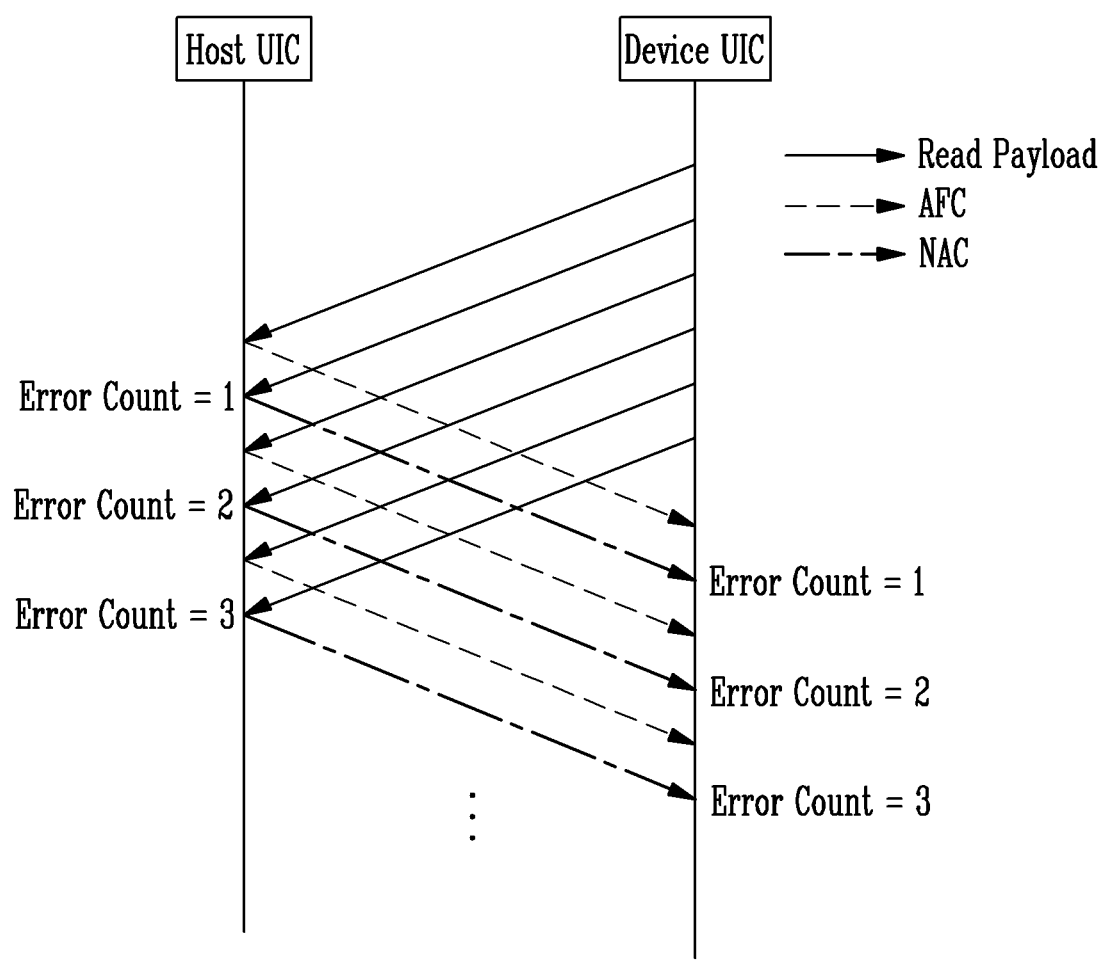
FIG. 6 is a diagram illustrating link quality degradation detection shown in FIG. 5.

FIG. 6 is a diagram illustrating the link quality degradation detection shown in FIG. 5.

Referring to FIG. 6, the Device UIC may provide read data (Read Payload) to the Host UIC. The Host UIC may provide acknowledgement flow control AFC to the Device UIC whenever the Host UIC normally receives the read data. When the Host UIC does not receive the read data from the Device UIC or abnormally receives the read data from the Device UIC, the Host UIC may provide negative acknowledgement NAC to the Device UIC.

The Host UIC may increment an error count whenever the Host UIC provides the negative acknowledgement NAC to the Device UIC. The Device UIC may increment an error count whenever the Device UIC receives the negative acknowledgement NAC from the host UIC. When the number of counted errors exceeds threshold, each of the host UIC and the Device UIC may detect that quality degradation of the link between the host UIC and the Device UIC has occurred.

Figure 7:
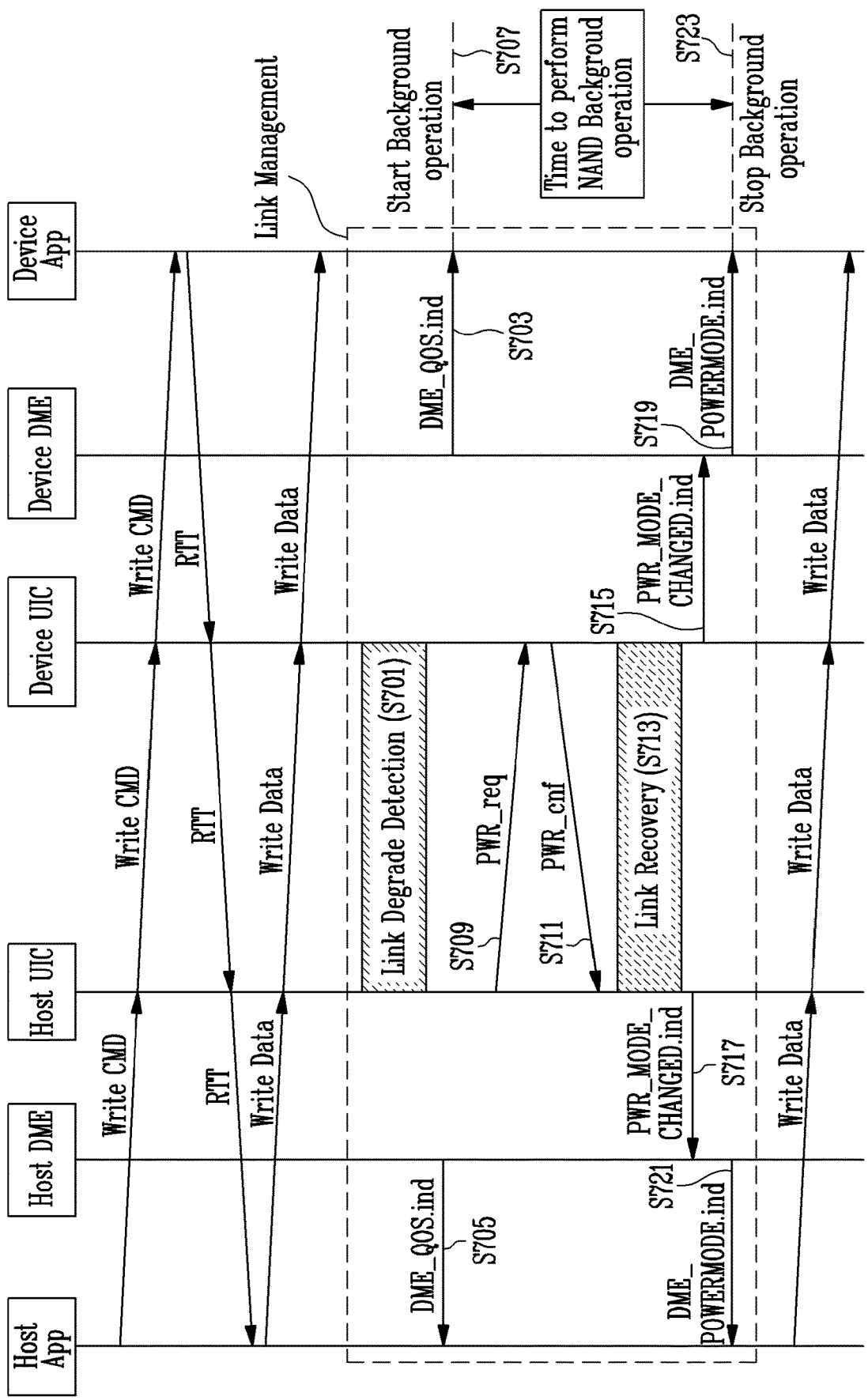
FIG. 7 is a diagram illustrating a link management operation in accordance with an embodiment of the present disclosure.

FIG. 7 is a diagram illustrating a link management operation in accordance with an embodiment of the present disclosure.

Referring to FIG. 7, a write command issued by the Host App may be transferred to the Device UIC through the Host DME and the Host UIC. The write command transferred to the Device UIC may be transferred to the Device App via the Device DME.

The Device App may transfer a ready to transfer RTT representing that the Device App is ready for receiving write data in response to the write command to the Host DME UIC through the Device DME and the Device UIC. The ready to transfer RTT transferred to the Host UIC may be transferred to the Host App via the Host DME.

The Host App may transfer write data to the Device UIC through the Host DME and the Host UIC, in response to the ready to transfer RTT. The write data transferred to the Device UIC may be transferred to the Device App via the Device DME. The Device App may control the memory device to program the received write data.

In FIG. 7, a link management operation of performing a link recovery operation when quality degradation of the link is detected may be performed. S701 to S723 are the same as S501 to S523, respectively, described with reference to FIG. 5.

When the link recovery operation is completed, the communication between the host and the storage device may be resumed, as before the link quality degradation is detected.

In an embodiment, the Device UIC and the Device DME may be implemented by the host interface described with reference to FIG. 1. The Device App may be implemented by the background controller described with reference to FIG. 1.

Figure 8:
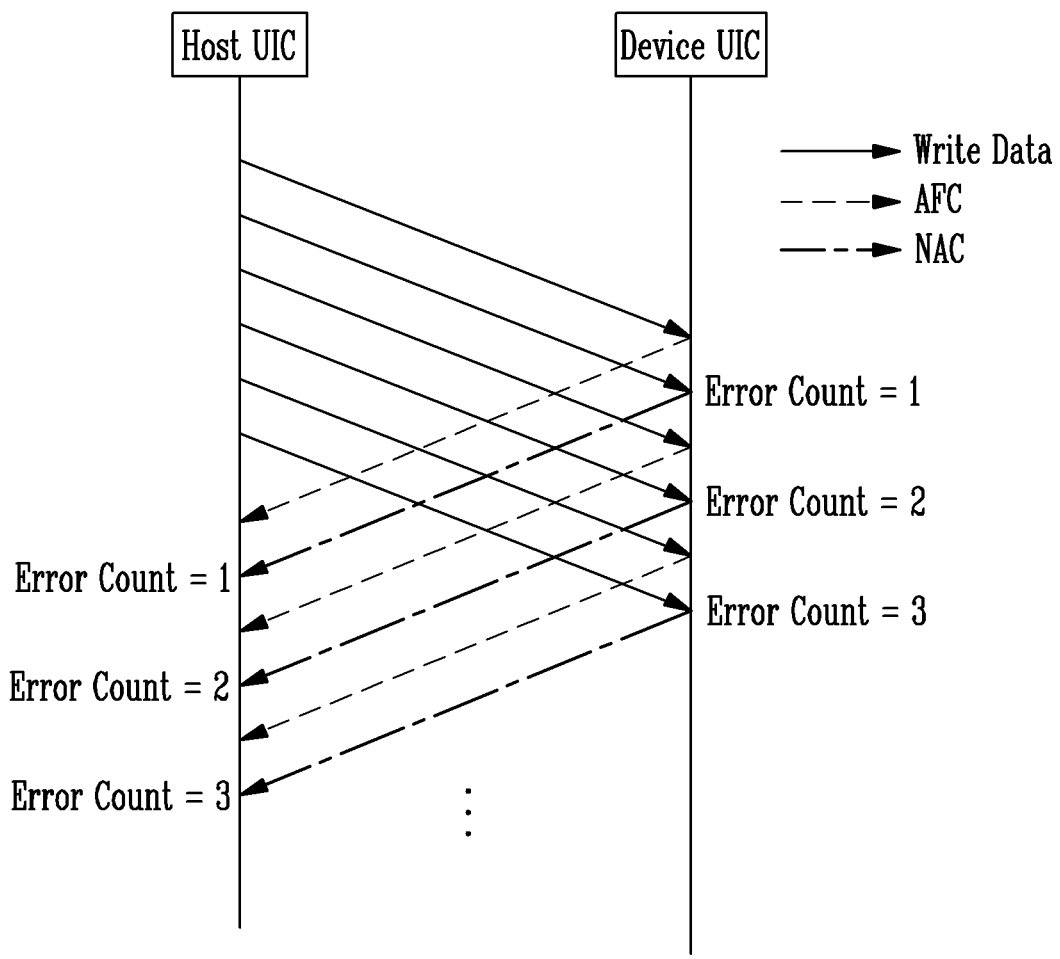
FIG. 8 is a diagram illustrating link quality degradation detection shown in FIG. 7.

FIG. 8 is a diagram illustrating the link quality degradation detection shown in FIG. 7.

Referring to FIG. 8, the Host UIC may provide write data to the Device UIC. The Device UIC may provide the Host UIC with acknowledgement flow control AFC whenever the Device UIC normally receives the write data. When the Device UIC does not receive the write data from the Host UIC or abnormally receives the write data from the Host UIC, the Device UIC may provide negative acknowledgement NAC to the Host UIC.

The Device UIC may increment an error count whenever the Device UIC provides the negative acknowledgement NAC to the Host UIC. The Host UIC may increment an error count whenever the Host UIC receives the negative acknowledgement NAC from the Device UIC. When the counted errors exceeds threshold, each of the host UIC and the Device UIC may detect that quality degradation of the link between the host UIC and the Device UIC has occurred.

Figure 9:
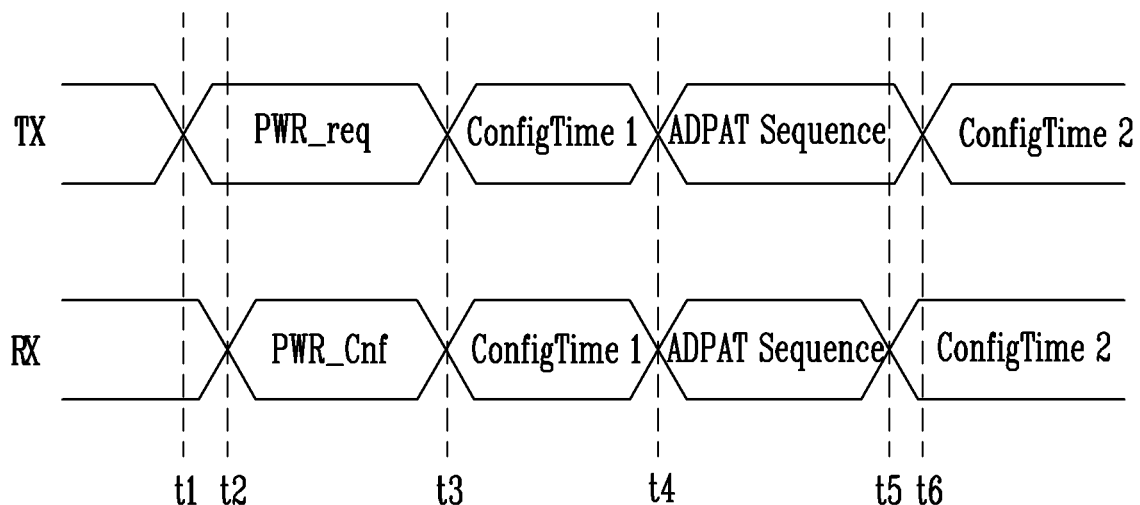
FIG. 9 is a diagram illustrating a link recovery operation shown in FIGS. 5 and 7.

FIG. 9 is a diagram illustrating the link recovery operation shown in FIGS. 5 and 7.

FIG. 9 illustrates a signal and timing between a transmitter TX and a receiver RX, which constitute a link, in the link recovery operation.

At t1, the transmitter may provide the receiver with an indicator PWR_req requesting a change in power configuration.

At t2, the receiver may provide the transmitter with a response indicator PWR_cnf representing whether the request for the change in power configuration has been accepted or rejected. In an embodiment, the change in power configuration may include a change in voltage condition, current condition, or temperature condition of the link.

At t3, either the transmitter or the receiver may wait for a first time ConfigTime1 such that the other end can transmit next data.

At t4, the transmitter and the receiver may perform the link recovery operation ("ADPAT Sequence") through the change in power configuration. When the link recovery operation is completed, each of the transmitter and the receiver may wait for a second time ConfigTime2 before transmission of next data is initiated.

Figure 10:
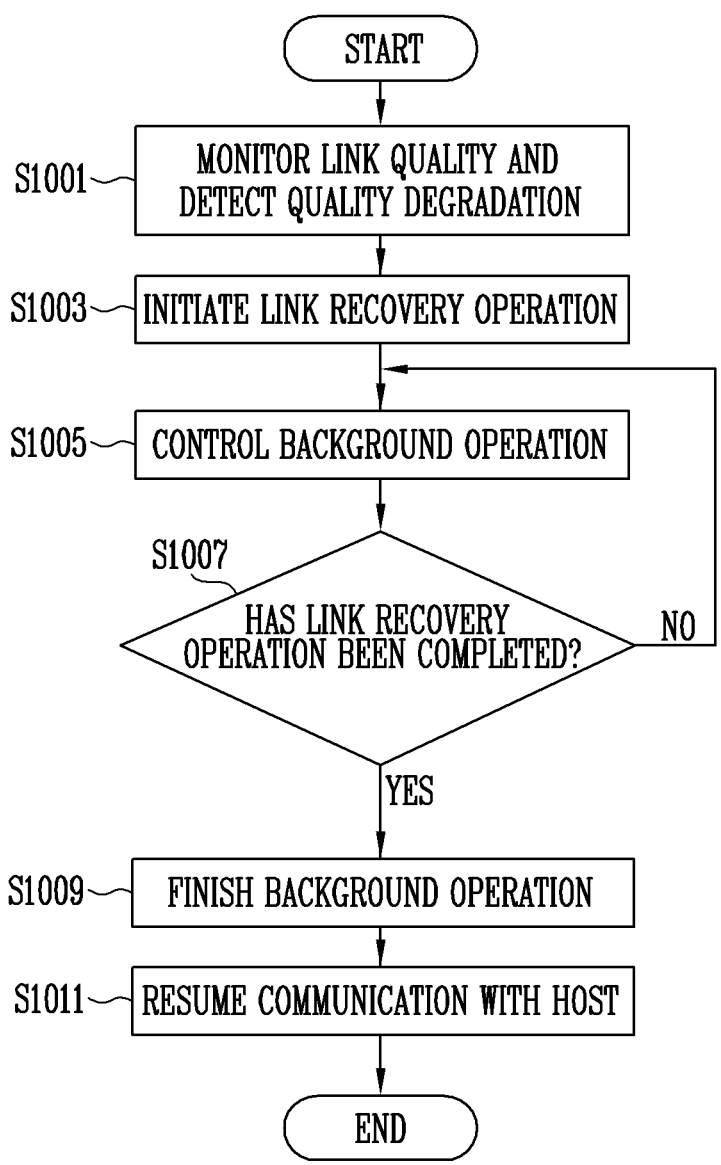
FIG. 10 is a flowchart illustrating an operation of the memory controller in accordance with an embodiment of the present disclosure.

FIG. 10 is a flowchart illustrating an operation of the memory controller in accordance with an embodiment of the present disclosure.

Referring to FIG. 10, in operation S1001, the memory controller may monitor quality of a link for communication with the host, and detect quality degradation of the link.

In operation S1003, the memory controller may initiate a link recovery operation. The link recovery operation may be an operation of equalizing, with a reference condition, a voltage condition of the link, a current condition of the link, or a temperature condition of the link, so as to compensate for link quality degradation.

In operation S1005, the memory controller may control the memory device to perform a background operation. The background operation may include a read reclaim operation, a wear leveling operation, and a garbage collection operation.

In operation S1007, the memory controller may determine whether the link recovery operation has been completed. When the link recovery operation is completed as the determination result, the memory controller may proceed to operation S1009. When the link recovery operation is not completed, the memory controller may proceed to the operation S1005.

In the operation S1009, the memory controller may control the memory device to finish the background operation.

In operation S1011, the memory controller may resume the communication with the host.

Figure 11:
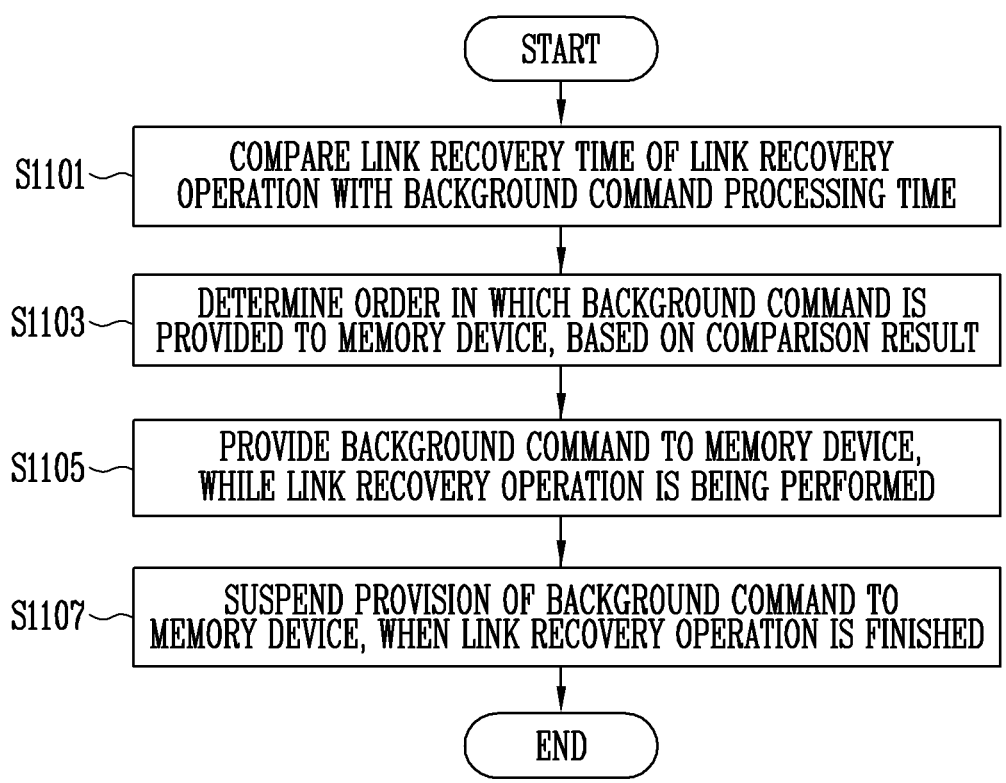
FIG. 11 is a flowchart illustrating an operation of the memory controller in accordance with an embodiment of the present disclosure.

FIG. 11 is a flowchart illustrating an operation of the memory controller in accordance with an embodiment of the present disclosure.

Referring to FIG. 11, in operation S1101, the memory controller may compare a link recovery time of a link recovery operation with a background command processing time.

In operation S1103, the memory controller may determine an order in which a background command is provided to the memory device, based on the comparison result.

The order in which commands are provided may be determined in various ways.

For example, the memory controller may determine the order in which commands are provided such that the largest number of background commands is processed while the link recovery operation is being performed. For example, the memory controller may determine the order in which commands are provided such that a background command for which it takes a longest time to be processed, among the queued background commands, is preferentially processed while the link recovery operation is being performed. For example, the memory controller may determine the order in which commands are provided such that a background command of which command processing time is a reference value or less, among the queued background commands, is preferentially processed. For example, the queue controller 221 memory controller may determine the order in which commands are provided such that a background command of which command processing time is the reference value or more, among the queued background commands, is preferentially processed.

In operation S1105, the memory controller may provide the background command(s) to the memory device according to the determined order while the link recovery operation is being performed.

In operation S1107, the memory controller may suspend or stop providing any background command to the memory device when the link recovery operation is finished.

Figure 12:
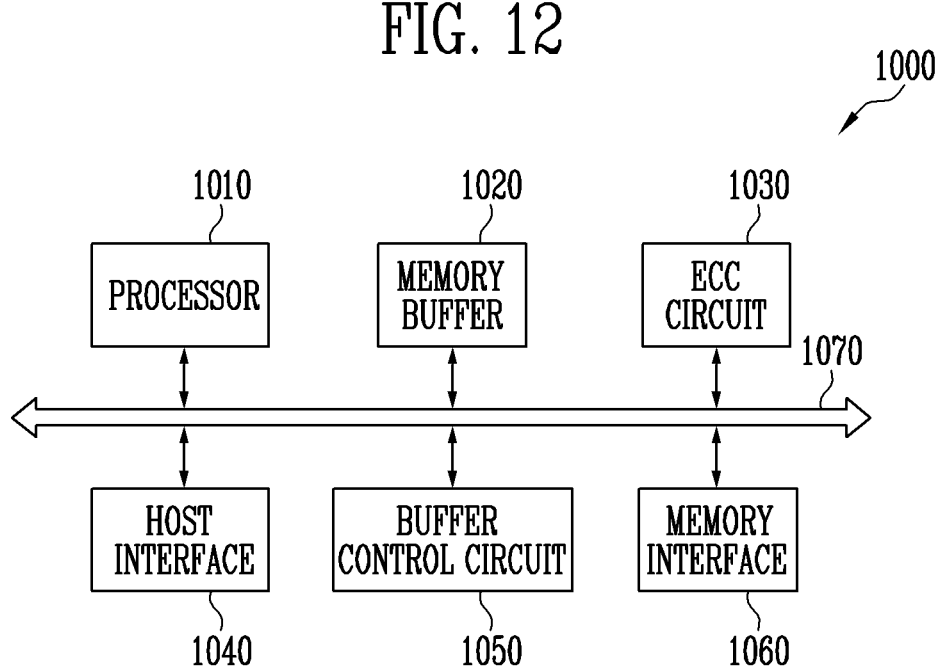
FIG. 12 is a diagram illustrating another embodiment of the memory controller shown in FIG. 1.

FIG. 12 is a diagram illustrating another embodiment of the memory controller shown in FIG. 1.

Referring to FIG. 12, a memory controller 1000 is coupled to a host and a memory device. The memory controller 1000 may access the memory device in response to a request received from the host. For example, the memory controller 1000 may control write, read, erase, and background operations of the memory device. The memory controller 1000 may provide an interface between the memory device and the host. The memory controller 1000 may drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operation of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LBA, using a mapping table, to translate the LBA into a PBA. Several address mapping methods of the FTL exist according to mapping units. Representative address mapping methods include a page mapping method, a block mapping method, and a hybrid mapping method.

The processor 1010 may randomize data received from the host. For example, the processor 1010 may randomize data received from the host, using a randomizing seed. The randomized data is provided as data to be stored to the memory device to be programmed in the memory cell array.

In a read operation, the processor 1010 may derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a NonVolatile Memory Express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

The buffer control circuit 1050 is configured to control the memory buffer 1020 under the control of the processor 1010.

The memory interface 1060 is configured to communicate with the memory device under the control of the processor

1010. The memory interface 1060 may communicate a command, an address, and data with the memory device through a channel.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, so as not to interfere with, nor influence, each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

In an embodiment, the host interface 1040 may operate identically to the host interface 210 described with reference to FIG. 1. The processor 1010 may operate identically to the background controller 220 described with reference to FIG. 1.

Figure 13:
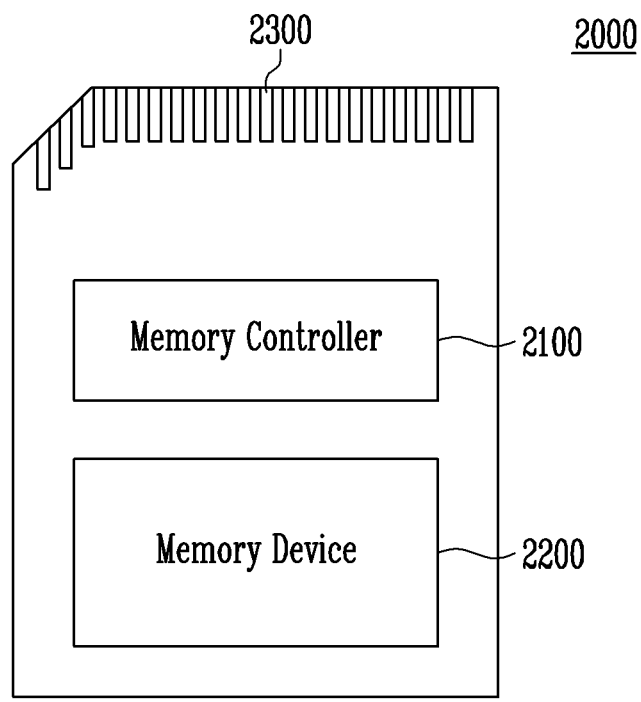
FIG. 13 is a block diagram illustrating a card system to which the storage device is applied in accordance with an embodiment of the present disclosure.

FIG. 13 is a block diagram illustrating a card system to which the storage device is applied in accordance with an embodiment of the present disclosure.

Referring to FIG. 13, the memory card system 2000 includes a memory controller 2100, a memory device 2200, and a connector 2300.

The memory controller 2100 is coupled to the memory device 2200. The memory controller 2100 may access the memory device 2200. For example, the memory controller 2100 may control write, read, erase, and background operations of the memory device 2200. The memory controller 2100 may provide an interface between the memory device 2200 and a host. The memory controller 2100 may drive firmware for controlling the memory device 2200. The memory controller 2100 may be implemented identically to the memory controller 200 described with reference to FIG. 1.

In an example, the memory controller 2100 may include components such as a Random Access Memory (RAM), a processor, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols, such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and/or NVMe.

In an example, the memory device 2200 may be implemented with any of various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and/or a Spin Torque Transfer magnetic RAM (STT-MRAM).

The memory controller 2100 and the memory device 2200 may be integrated into a single semiconductor device to constitute a memory card, such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and/or a Universal Flash Storage (UFS).

Figure 14:
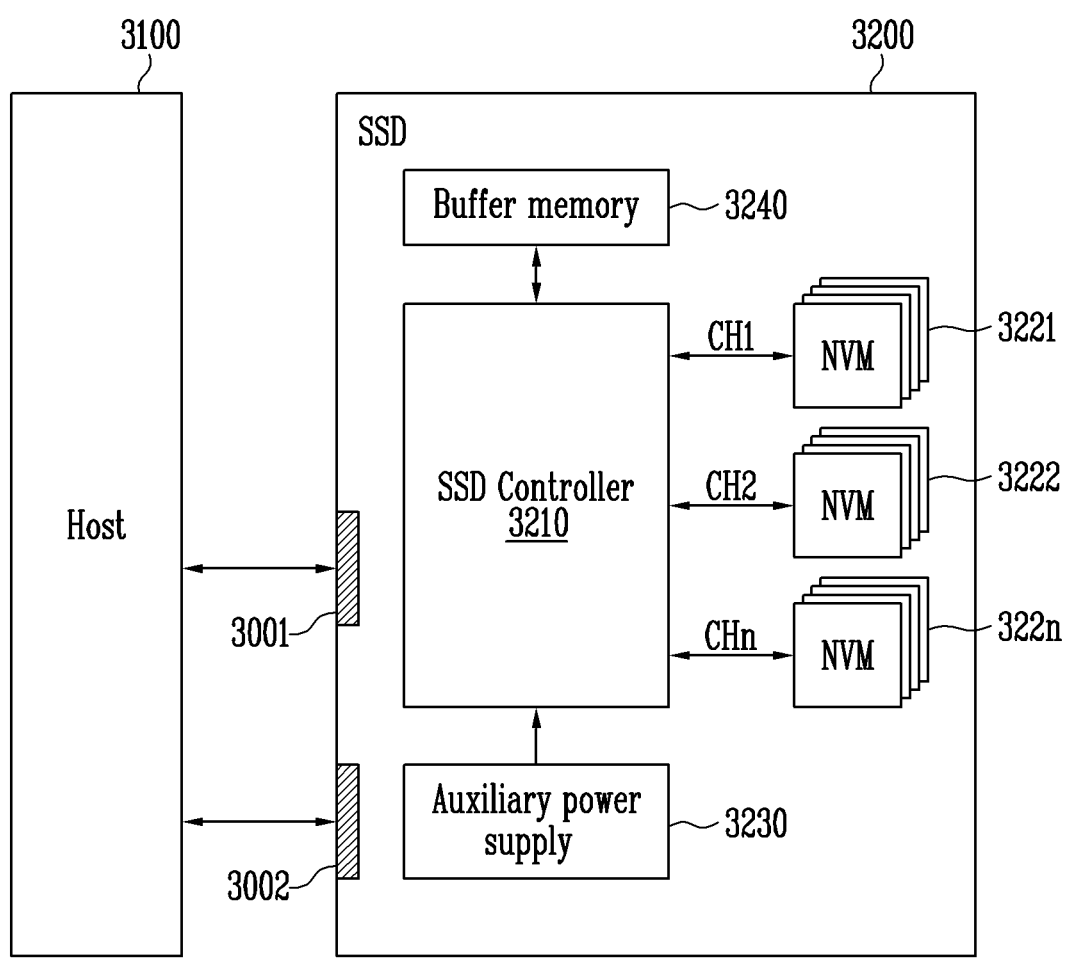
FIG. 14 is a block diagram illustrating a Storage Device in accordance with an embodiment of the present disclosure.

FIG. 14 is a block diagram illustrating a Solid State Drive (SDD) to which the storage device is applied in accordance with an embodiment of the present disclosure.

Referring to FIG. 14, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be based on an interface between the host 3100 and the SSD 3200. For example, the signal SIG may be defined by at least one of various interfaces, such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and/or an NVMe.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be disposed in, or external to, the SSD 3200. For example, the auxiliary power supply 3230 may be disposed on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include any of various volatile memories such as a DRAM, an SDRAM, a DDR SDRAM, an LPDDR SDRAM, and a GRAM or nonvolatile memories such as a FRAM, a ReRAM, an STT-MRAM, and/or a PRAM.

Figure 15:
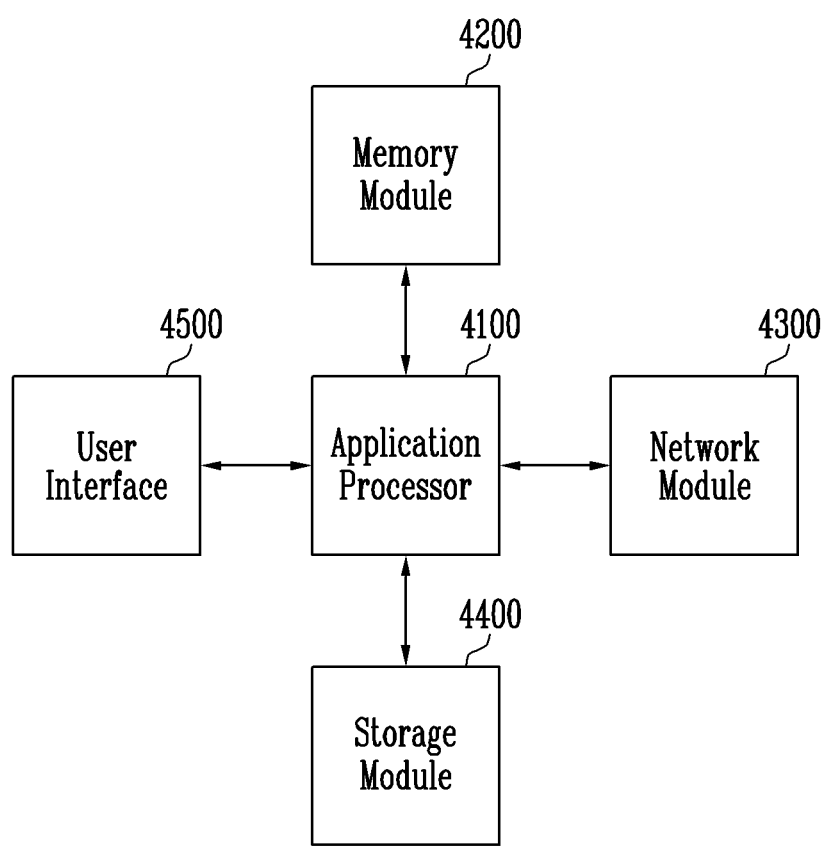
FIG. 15 is a block diagram illustrating a user system to which the storage device is applied in accordance with an embodiment of the present disclosure.

FIG. 15 is a block diagram illustrating a user system to which the storage device is applied in accordance with an embodiment of the present disclosure.

Referring to FIG. 15, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and/or an LPDDR3 SDRAM or nonvolatile random access memories such as a PRAM, a ReRAM, an MRAM, and/or a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, each of which may operate identically to the memory device 100 described with reference to FIG. 1. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with embodiments of the present disclosure, a memory controller for efficiently performing a background operation and an operating method of the memory controller are provided.

What is claimed is:

1. A memory controller for controlling a memory device, the memory controller comprising:
    a host interface configured to communicate with a host through a link, determine whether quality of the link has been degraded by monitoring the quality of the link, and perform a link recovery operation on the link in response to a determination that the quality of the link is degraded; and
    a background controller configured to control the memory device to perform a background operation, while the link recovery operation is being performed,
    wherein the background operation includes at least one of a read reclaim operation, a garbage collection operation, and a wear leveling operation.

2. The memory controller of claim 1, wherein the host interface includes:
    a link monitoring component configured to monitor the quality of the link, and generate link quality information representing whether the quality of the link has been degraded based on a result of the monitoring; and
    a link manager configured to perform the link recovery operation based on the link quality information, and generate link recovery time information on the link recovery operation.

3. The memory controller of claim 2, wherein the link recovery operation compensates for quality degradation of the link by equalizing, to a corresponding reference condition, at least one of a voltage condition, a current condition, and a temperature condition of the link.

4. The memory controller of claim 1, wherein the background controller includes:
    a background queue configured to store multiple background commands; and
    a queue controller configured to determine an order in which the multiple background commands are provided to the memory device, based on link recovery time information, and provide at least one background command to the memory device based on the determined order.

5. The memory controller of claim 4, wherein the queue controller stores command processing time information on each of the multiple background commands, and determines a target background command to be preferentially provided to the memory device, among the multiple background commands, based on a result obtained by comparing the command processing time information with the link recovery time information.

6. The memory controller of claim 5, wherein the queue controller determines the target background command such that a maximum number of background commands, among the multiple background commands, is processed, while the link recovery operation is being performed.

7. The memory controller of claim 5, wherein the queue controller determines the target background command such that a background command of which command processing time is a reference time or less, among the multiple background commands, is preferentially processed, while the link recovery operation is being performed.

8. The memory controller of claim 5, wherein the queue controller determines the target background command such that a background command of which command processing time is a reference time or more, among the multiple background commands, is preferentially processed, while the link recovery operation is being performed.

9. The memory controller of claim 5, wherein the queue controller determines the target background command such that a background command of which command processing time is longest, among the multiple background commands, is preferentially processed, while the link recovery operation is being performed.

10. The memory controller of claim 4, wherein the link manager generates link recovery initiation information representing a time at which the link recovery operation is initiated and link recovery finish information representing a time at which the link recovery operation is finished.

11. The memory controller of claim 10, wherein the queue controller starts to provide at least one background command from the background queue to the memory device in response to the link recovery initiation information, and suspends providing any background command remaining in the background queue to the memory device in response to the link recovery finish information.

12. A method for operating a memory controller for controlling a memory device, the method comprising:
- determining whether quality of a link for communication with a host has been degraded based on a result obtained by monitoring the quality of the link;
- performing a link recovery operation on the link in response to a determination that the quality of the link is degraded; and
- controlling the memory device to perform a background operation, while the link recovery operation is being performed,
- wherein the background operation includes at least one of a read reclaim operation, a garbage collection operation, and a wear leveling operation.

13. The method of claim 12, further comprising generating link recovery time information on the link recovery operation.

14. The method of claim 13,
- wherein the memory controller includes a background queue configured to store multiple background commands, and
- wherein the controlling of the memory device to perform the background operation includes:
  - determining an order in which the multiple background commands are provided to the memory device based on the link recovery time information; and
  - providing at least one background command to the memory device based on the determined order.

15. The method of claim 14, wherein the determining of the order in which the multiple background commands are provided to the memory device includes:
- comparing command processing time information on each of the at least one background command with the link recovery time information; and
- determining a target background command to be preferentially provided to the memory device, among the multiple background commands, based on a result of the comparing.

16. The method of claim 14, wherein the providing of the at least one background command to the memory device includes:
- starting to provide at least one background command from the background queue to the memory device when the link recovery operation is initiated; and
- suspending providing of any background command remaining in the background queue to the memory device when the link recovery operation is finished.

17. The method of claim 12, wherein the performing of the link recovery operation includes equalizing, to a corresponding reference condition, at least one of a voltage condition, a current condition, and a temperature condition of the link.

18. The method of claim 17, wherein the reference condition is determined according to a protocol applied to the link or is determined according to a request of the host.

* * * * *